Nov. 21, 1967  G. W. PARSONS ET AL  3,354,300
PHOTOGRAPHIC APPARATUS

Original Filed May 13, 1964

GEORGE W. PARSONS
RONALD G. PETTS
INVENTORS

BY Robert W. Hampton
Ronald S. Hauler

ATTORNEY

United States Patent Office 3,354,300
Patented Nov. 21, 1967

3,354,300
PHOTOGRAPHIC APPARATUS
George W. Parsons, Hughesville, and Ronald G. Petts, Williamsport, Pa., assignors, by mesne assignments, to Eastman Kodak Company, Rochester, N.Y., a corporation of New Jersey
Original application May 13, 1964, Ser. No. 367,125, now Patent No. 3,319,547, dated May 16, 1967. Divided and this application Dec. 19, 1966, Ser. No. 602,881
6 Claims. (Cl. 240—1.3)

This application is a division of U.S. application Ser. No. 367,125, filed May 13, 1964, now Patent No. 3,319,547. The invention relates to photographic apparatus provided with flashlamp attachments.

Over the years, flashlamp attachments have assumed many forms and shapes. In the early days of flashlamp photography, most flashlamp attachments were quite large in size relatively speaking with respect to the size of the cameras with which they were designed to be employed. This was due in part to the size of the flashlamps available commercially at the time. In more recent years lamp manufacturers have introduced flashlamps of diminishing size. Fifteen years ago, the most popular flashlamp was the Press 25, a lamp having an internal volume of about 31 cc. Today the most popular flashlamp is the AG–1, a lamp having an internal volume of about 1.2 cc. This tremendous decrease in the size of the popular, commercial flashlamps has made it possible for the manufacturers of photographic equipment to re-design flashlamp attachments with a view to simplification and miniaturization.

A primary object of this invention is to effect a further improvement in the integration of the flashlamp function with camera operation.

In the copending application of L. F. Anderson et al., Ser. No. 335,013, filed January 2, 1964, and issued April 5, 1966 as U.S. Patent No. 3,244,887, there is disclosed a photographic flashlamp unit adapted to be mounted on the top of a camera. This unit comprises a package of photoflash lamps, each having its own reflector, and arranged with the depending electrical contacts thereof extending through a base member for engagement with electrical contacts associated with the main body of the camera.

The principal object of this invention is to provide movable support means for indexing a flashlamp unit of the aforesaid type for use with the sequential operations of a camera.

This and other objects, advantages and features are attained in accordance with the principles of this invention, by providing a photographic apparatus with mechanical means connecting the photographic flashlamp unit with an accessible handle member such that actuation of the handle will displace the photographic flashlamp unit and advance a new flashlamp into firing position. One of the features of the apparatus of this invention is the inclusion of automatic means for arresting the displacement of the flashlamp unit after a new lamp has been advanced into firing position, even if further operation of the handle may be required for other purposes.

In the accompanying drawing illustrating a specific embodiment of the invention, FIGURE 1 is a perspective view of a flashlamp unit actuating mechanism according to the invention.

Figure 1:
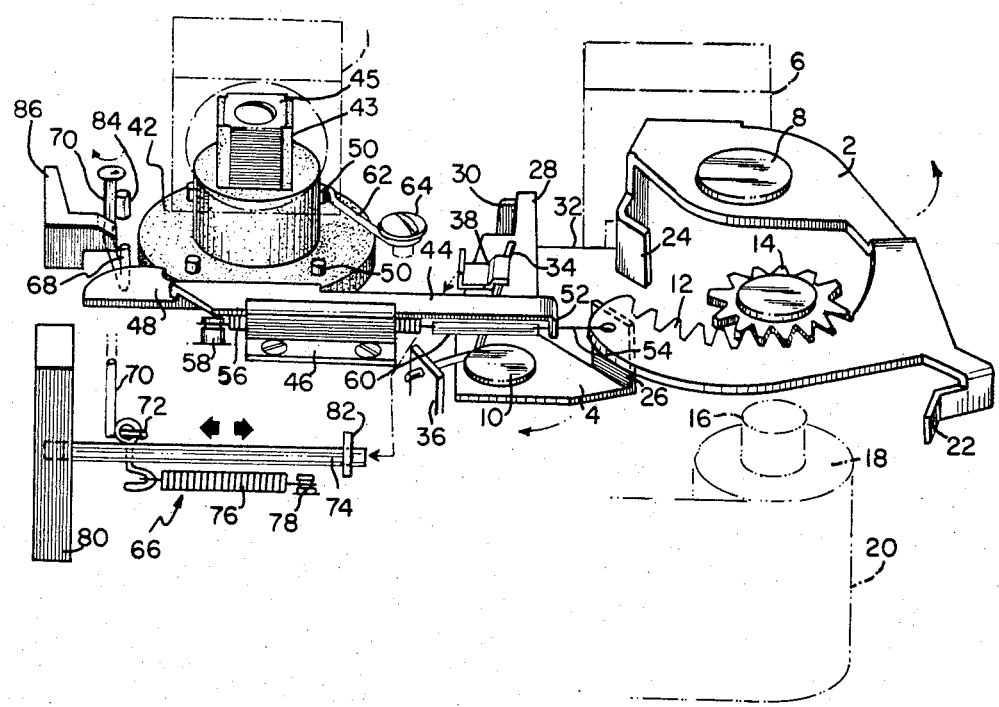

Referring now to the drawing, the flashlamp actuating mechanism is operated by a film advancing mechanism which film advance mechanism per se forms no part of this invention and has been disclosed merely for illustrative purposes, in order to show one form of an accessible handle with which the flashlamp unit actuating mechanism of this invention may be employed. The film advancing mechanism and the flashlamp unit actuating mechanism are located on suitable mounting surfaces on the top of the camera, immediately beneath a cover plate with which the top of the camera is provided. For clarity of illustration, these mounting surfaces have been omitted in the accompanying drawing.

The film advancing mechanism comprises a hand actuated, reciprocatable film advancing lever 2, a shutter actuating lever 4, and a shutter release 6. The film advancing lever 2 and the shutter actuating lever 4 are pivotally mounted at 8 and 10 respectively on suitable mounting surfaces in the camera. The shutter release 6 is supported from the front face of the camera.

The film advancing lever 2 is provided with a curved rack 12 which meshes with a pinion 14 fitted on spindle 16 of film takeup spool 18. Thus film 20 is wound on spool 18 by actuation of lever 2, the lever being provided with a handle 22 for this purpose. An end of the film advancing lever 2 is provided with a depending tab 24 which, during a portion of the operating cycle of the lever 2, is displaced into engagement with a tab 26 upstanding on an end of the shutter actuating lever 4 to cock the actuating lever 4. The other end of the shutter actuating lever 4 is provided with a projecting finger 28 which, in the FIG. 1 position, is in engagement with a finger 30 formed on a lateral extension 32 of the shutter release 6. The shutter actuating lever 4 is a spring-loaded member, the torsion spring 34 performing this function. The spring 34 is looped around the pivot 10, one end thereof being anchored in a stationary plate 36 and the other end being constrained by the block 38 mounted on the top face of lever 4.

The operation of the film advancing mechanism will now be described. At the outset it should be noted that only the handle 22 of the film advancing lever 2 and the upper portion of the shutter release 6 lie outside the casing or face plates with which the main body of the camera is provided.

Figure 2:
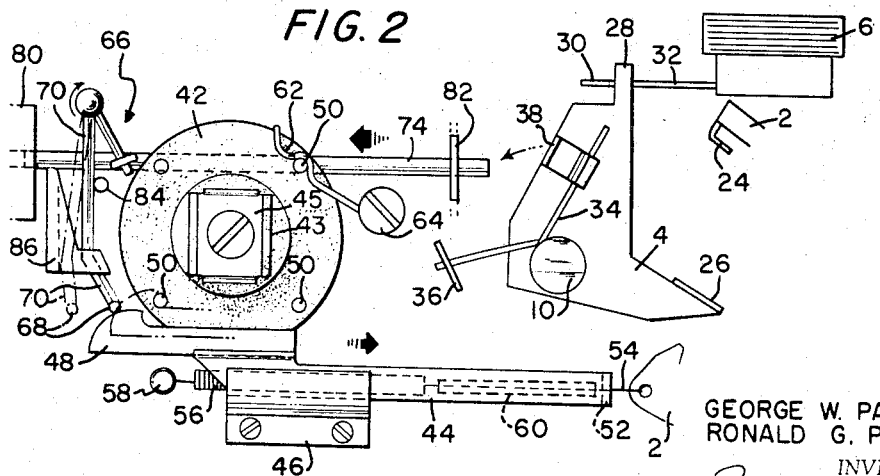
FIGURE 2 is a fragmentary plan view of the mechanism of FIGURE 1.

The mechanism just described is illustrated in FIGS. 1 and 2 in the cocked position, i.e., ready for a picture to be taken. A picture is taken when an operator depresses the shutter release 6. When the shutter release 6 is pushed down, the finger 30 on the lateral extension 32 thereof moves downwardly therewith and out of interlocking engagement with the finger 28 of the shutter actuating lever 4. This releases the spring-loaded shutter actuating lever 4 and permits it to rotate counterclockwise about its pivot 10 as viewed in FIGS. 1 and 2. It is during this counterclockwise rotational movement that the projecting finger 28 of the lever 4 trips the shutter (not shown) to admit light to the film for the actual picture-taking operation. Pressure is then removed from the shutter release 6 to thereby permit it to return to its normal rest position as shown in the accompanying drawing.

The camera is prepared or reset for the next exposuring making or picture-taking operation by winding the film to advance the next exposure frame thereof and by cocking the shutter. This is accomplished by operation of the film advancing lever 2. The film advancing lever 2 is rotated counter-clockwise about its pivot 8 by manipulation of the handle 22 thereof, and this effects rotation of the spool 18 on which the film 20 is wound, through rack 12, pinion 14 and spindle 16. Since the shutter actuating lever 4 was displaced counter-clockwise somewhat from the FIG. 1 position during the previous picture-taking operation, the upstanding tab 26 thereof lies quite close to and in the path of the depending tab 24 of the film advancing lever 2. Thus, as the film advancing lever 2 is rotated counter-clockwise about its pivot 8 to advance the film 20, the depending tab 24 thereof engages and deflects tab 26 of the shutter actuating lever 4 causing clockwise rotation thereof about its pivot 10. As the shutter actuating lever 4 rotates clockwise about its pivot 10, the projecting finger 28 thereof rides up and over the finger 30 into interlocking engagement therewith. At about this time the film advancing lever 2 has been fully advanced in a counter-clockwise direction. Thus the handle 22 thereof may now be released to permit the return of the lever 2 to its normal position as shown in FIG. 1. The camera is now cocked for the taking of the next picture.

The mechanism for integrating the indexing of a flashlamp unit with a film advancing and shutter cocking means so that actuation of the latter will automatically effect indexing of the former will now be described. The flashlamp unit indexing mechanism is organized about a mounting plate (not shown) which is disposed at the top of a camera having an integral flash assembly.

Figure 3:
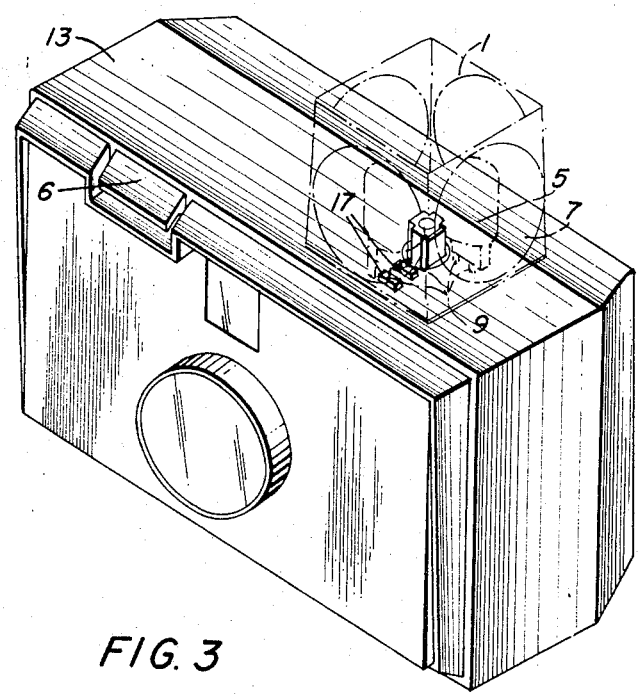
FIGURE 3 is a perspective view of a camera embodying the present invention with a flashlamp unit mounted thereon.

The indexing mechanism comprises a rotatable spindle 42, on which a flashlamp unit 1 of the type disclosed in the above referenced Anderson et al. pending application is mounted, and a pawl 44 for rotating the spindle 42 and thus effect indexing of the flashlamp unit mounted thereon. Referring to FIG. 3, the unit 1 comprises a plurality of photoflash lamps 5 with individual reflectors 7 and depending electrical contacts 9 extending through the base for electrical engagement with the electrical contacts 17 at the top of the camera casing 13. The spindle 42 is a substantially cylindrical member but has a mounting block 43 formed on the top thereof, to which a leaf spring 45 is attached. This block-spring arrangement defines a means accessible from outside the casing 13 (FIG. 3) for supporting and retaining a flashlamp unit 1 on the spindle. The pawl 44 is a long finger-like linking member slidably disposed in a stationary pawl guide 46. One end of the pawl 44 is provided with a hook 48 which, when the pawl is advanced, engages one of several pins 50 upstanding on spindle 42 and through it rotates the spindle 42 to effect indexing of the flashlamp unit mounted thereon. The other end of the pawl 44 is provided with a depending tab 52 having an aperture therein through which one end of a straight wire 54 extends, this end of the wire being connected to the free end of the curved rack 12 of the film advancing lever 2. The other end of the straight wire 54 is connected to and preferably formed integral with one end of a tension spring 56. The other end of the tension spring 56 is secured to a stationary spring pin 58. As shown in the accompanying drawing, the major portion of the tension spring 56 and the straight wire 54 which serves as an extension thereof lies beneath the finger-like pawl 44. A sleeve 60, concentric with the straight wire 54, is secured thereto and functions as a drive means engageable with tab 52 to advance the pawl 44 by transmitting force produced by actuation of the film advance lever to the pawl 44.

In operation, when the film advancing lever 2 is rotated counter-clockwise about its pivot 8 to wind the film and cock the shutter as described above, it draws the pawl 44 with it through the wire 54 which is connected to the free end of the curved rack 12 thereof. During the initial phase of this rotation of lever 2, the pawl 44 is canted sufficiently to displace the hook 48 thereof from solid to phantom in FIG. 2 and thus into interlocking engagement with a pin 50 to further transmit the produced face to the engaged pin 50. During this same initial phase of the rotation of lever 2, the straight wire 54 and the sleeve 60 concentric therewith are carried along therewith and the forward end of the sleeve 60 has moved into abutting engagement with the tab 52 depending from the front end of pawl 44. As the rotation of the lever 2 continues, the sleeve 60 now drives the pawl 44 forward with the hook 48 in engagement with pin 50 to thereby rotate the spindle 42 and thus the flashlamp unit mounted thereon about ninety degrees.

Since the flashlamp unit mounted on the spindle 42 is a foursided article with a flashlamp disposed on each side thereof, it is highly desirable to provide some means for arresting the rotation of the spindle 42 after it has rotated the desired ninety degrees so that proper disposition of a flashlamp for each new picture will be insured. A latch spring 62 overlying the spindle 42 is provided for this purpose. The spring 62, one end of which is held stationary by screw 64, is shaped intermediate its ends to define a camming surface and a notch so that each time the spindle 42 is rotated ninety degrees by the pawl 44 through the action of its hook 48 on one of the pins 50, the pin 50 located ninety degrees forward thereof will snap into locking engagement with latch spring 62.

With some cameras, more than one operating stroke of the film advancing lever may be required to advance the film sufficiently to place a new exposure frame in the picture-taking position. The apparatus of our invention includes means for preventing further rotation of the spindle 42 after it has been advanced the prescribed ninety degrees, even though further operation of the film advancing lever 2 is effected. This is accomplished by a pawl lockout mechanism identified by the general reference number 66.

The pawl lockout mechanism 66 includes a stop 68 which is movable into and out of the path of the hook 48 of the pawl 44. The stop 68 is in the form of an upstanding finger formed on one end of a wire 70. The wire 70 extends through the mounting plate (not shown) on which the spindle 42 is supported, the other end of the wire 70 being connected to one end of a hook 72 fitted in and extending through a pawl stop actuating rod 74. The other end of hook 72 is connected to one end of a tension spring 76, the other end of spring 76 being secured to a fixed spring 78. The pawl stop actuating rod 74 is reciprocably supported between an outside wall 80 and an inside wall 82 of the camera body. One end of the rod 74 extends through the inside wall 82 and is actuated by the counter-clockwise rotation of shutter actuating lever 4 through the block 38 thereof.

As described above, when the shutter release 6 is actuated to take a picture, the shutter actuating lever 4 rotates counterclockwise about its pivot 10 and, in doing so, the block 38 mounted thereon moves into engagement with and displaces the pawl stop actuating rod 74 to the left as viewed in FIGS. 1 and 2. Since the rod 74 is connected to wire 70 through hook 72, this displacement of rod 74 displaces the wire 70 from solid to phantom, as shown in FIG. 2.

It will be noted particularly that this displaced locus of the stop 68 of the wire 70 places it out of the path of the travel of the hook end 48 of the pawl 44. Thus, when the first stroke is imparted to the film advancing lever 2 to advance the film and cock the shutter, the pawl 44 will be drawn forward therewith, the hook 48 thereof engaging a pin 50 on spindle 42 and rotating it counter-clockwise ninety degrees to thus locate a fresh flashlamp in picture-taking position. Since, as just noted, this first stroke of the film advancing lever cocks the shutter, this means that the block 38 on the shutter actuating lever 4 has been displaced from engagement with the pawl stop actuating rod 74. This permits the tension spring 76 to return the rod 74 to the position illustrated in FIGS. 1 and 2 and to displace the wire 70 and the stop 68 on an end thereof from phantom to solid in FIG. 2. Thus, when the pawl 44 returns, on the return of the first stroke of the film advancing lever 2, the stop 68 will be lying in the path of the hook 48 and will deflect it sufficiently so that if another stroke or a portion thereof is imparted to the film advancing lever 2 and the pawl 44 which is connected thereto, the hook 48 will be prevented from engaging a pin 50 and effecting further rotation of spindle 42. The pawl lockout mechanism 66 will remain in this lockout condition, regardless of how many strokes are imparted to the film advancing lever 2, until the next picture is taken, during which operation the shutter actuating lever 4 will have rotated counter-clockwise and the block 38 thereof will have displaced the pawl stop actuating rod 74 and thus the wire 70 from solid to phantom in FIG. 2 to thereby again permit the hook 48 of the pawl 44 to swing into engagement with a pin 50 of spindle 42 and rotate it ninety degrees counter-clockwise during the next stroke of the pawl 44. A pin 84 and a block 86, upstanding on the mounting plate (not shown) are located on opposite sides of the wire 70 and define stops to limit the displacement of the wire 70 during operation of the pawl lockout mechanism 66.

While a specific, preferred embodiment of the invention has been shown and described, it will be readily appreciated that the invention may comprise other forms such as a separate flash device that is connectable to a camera. In this instance, the handle 22 may perform no function, such as film wind, that is normally associated with a photographic camera. Therefore, changes can be resorted to without departing from the spirit of the invention or the scope of the subjoined claims.

We claim:
1. Photographic apparatus comprising:
a casing including electrical contacts;
a rotatable spindle within the casing;
a mounting block and spring means formed on the spindle for rotation therewith, the block and spring means being accessible from outside the casing to detachably support and retain for rotation therewith a unitary flashlamp package comprising a plurality of photoflash lamps, each lamp having its own reflector and depending electrical contacts extending through the package base, the lamp electrical contacts selectively engageable with the casing electrical contacts at a firing locus, and
movable handle operating means accessible from outside the casing and means interconnecting the handle means and spindle to rotate the spindle and block and spring means predetermined amounts in response to actuation of the handle means and correspondingly rotate the supported flashlamp package to sequentially advance the lamps and their respective reflectors to the firing locus.

2. The apparatus according to claim 1 and further comprising latch means selectively engageable with the spindle to arrest rotation of the spindle after each predetermined amount of rotation.

3. The apparatus according to claim 2 wherein the interconnecting means comprises a plurality of pins on the spindle, a slidable pawl selectively engageable with the pins, and means connecting the pawl and handle means for movement of the pawl with the handle means to engage a pin and rotate the spindle a predetermined amount.

4. The apparatus according to claim 1 and comprising means to disengage the interconnecting means to prevent further rotation of the spindle after each predetermined amount of rotation and to reengage the interconnecting means after firing of the flashlamp at the firing locus.

5. The apparatus according to claim 4 wherein the interconnecting means comprises a plurality of pins on the spindle, a slidable pawl selectively engageable with the pins, and means connecting the pawl and handle means for movement of the pawl with the handle means to engage a pin and rotate the spindle a predetermined amount.

6. The apparatus according to claim 5 wherein the pawl is laterally deflectable, and the disengaging means comprises stop means to deflect the pawl laterally and prevent selective engagement of the pawl with the pins.

References Cited
UNITED STATES PATENTS

| | | | |
|---|---|---|---|
| 3,080,804 | 3/1963 | Steineck | 240—1.3 XR |
| 3,087,318 | 4/1963 | Oswold | 240—1.3 XR |
| 3,096,025 | 7/1963 | Prochnow | 240—1.3 |
| 3,244,087 | 4/1966 | Anderson et al. | 95—11 |

NORTON ANSHER, *Primary Examiner.*

FRED L. BRAUN, *Assistant Examiner.*